(12) United States Patent
Tanaka (10) Patent No.: US 7,102,966 B2
(45) Date of Patent: Sep. 5, 2006

(54) LENS ACTUATOR, OPTICAL PICKUP UNIT AND OPTICAL DISK APPARATUS

(75) Inventor: Akihiro Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 417 days.

(21) Appl. No.: 10/671,612

(22) Filed: Sep. 29, 2003

(65) Prior Publication Data

US 2004/0130976 A1 Jul. 8, 2004

(30) Foreign Application Priority Data

Oct. 8, 2002 (JP) ............................ 2002-294609
May 16, 2003 (JP) ............................ 2003-138918

(51) Int. Cl.
*G11B 7/095* (2006.01)

(52) U.S. Cl. ............................... 369/44.16; 369/44.32; 369/53.19

(58) Field of Classification Search ............. 369/44.16, 369/44.32, 53.19
See application file for complete search history.

(56) References Cited

U.S. PATENT DOCUMENTS

| | | | |
|---|---|---|---|
| 4,696,361 A | 9/1987 | Clark et al. ................ | 180/68.4 |
| 4,878,460 A | 11/1989 | Uchida et al. ......... | 123/52 MV |
| 4,911,135 A | 3/1990 | Nishimura et al. ......... | 123/563 |
| 6,339,511 B1 * | 1/2002 | Tanaka ........................ | 359/813 |
| 6,904,607 B1 * | 6/2005 | Wada ......................... | 720/684 |
| 2001/0026404 A1 * | 10/2001 | Suh ............................. | 359/822 |
| 2001/0038581 A1 * | 11/2001 | Kawano et al. ........ | 369/44.16 |
| 2002/0027841 A1 | 3/2002 | Tanaka | |
| 2003/0015361 A1 | 1/2003 | Bland ........................ | 180/68.1 |

FOREIGN PATENT DOCUMENTS

| | | |
|---|---|---|
| EP | 0 952 024 A2 | 10/1999 |
| GB | 1 380 874 | 1/1975 |
| JP | 59 34929 | 2/1984 |
| JP | 2856176 | 11/1998 |
| JP | 2001-34974 | 2/2001 |

\* cited by examiner

*Primary Examiner*—Wayne Young
*Assistant Examiner*—Van T. Pham
(74) *Attorney, Agent, or Firm*—Dickenstein Shapiro LLP (57) ABSTRACT

A lens actuator includes a lens holder to support an objective lens and having a pair of first side surfaces in a tracking direction and a pair of second side surfaces in a tangential direction, a fixed magnet disposed to confront the second side surface and comprising four regions having approximately the same area and are magnetic, such that magnetic directions of the four regions are perpendicular to a plane including a focusing direction and the tracking direction but are in opposite directions between two mutually adjacent regions, a pair of tracking coils disposed between the second surface and the magnet and having centers located on an outer side of corresponding centers of the four regions in the tracking direction, a focusing coil disposed between the second surface and the magnet and having a center located on an outer side of corresponding centers of the four regions in the focusing direction, and a radial tilt coil disposed between the second surface and the magnet and having a center located on an outer side of corresponding centers of the four regions in the focusing direction.

12 Claims, 9 Drawing Sheets

FIG.1

PRIOR ART

LENS ACTUATOR, OPTICAL PICKUP UNIT AND OPTICAL DISK APPARATUS

BACKGROUND OF THE INVENTION

This application claims the benefit of Japanese Patent Applications No.2002-294609 filed Oct. 8, 2002 and No.2003-138918 filed May 16, 2003, in the Japanese Patent Office, the disclosures of which are hereby incorporated by reference.

1. Field of the Invention

The present invention generally relates to, and more particularly to lens actuators, optical pickup units and optical disk apparatuses, and more particularly to a lens actuator which turns an objective lens about a center axis along a focusing direction, about a center axis along a tracking direction and about a center axis along a tangential direction, an optical is pickup unit which uses such a lens actuator, and an optical disk apparatus having such an optical pickup unit.

2. Description of the Related Art

Figure 1:
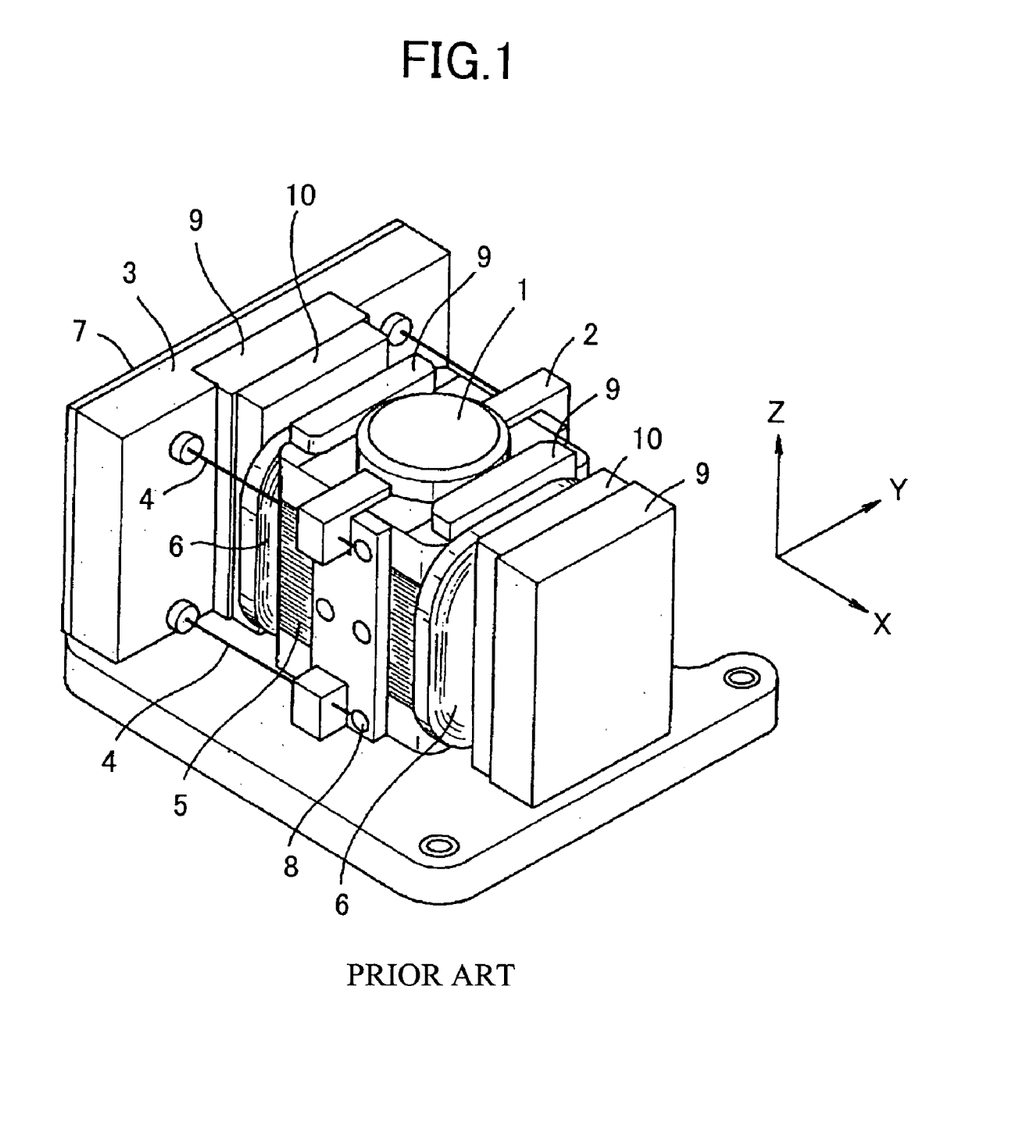
FIG. 1 is a perspective view showing an example of a conventional lens actuator.

A description will be given of an example of a conventional lens actuator, that is, an objective lens driving unit for an optical disk apparatus, by referring to FIG. 1. FIG. 1 is a perspective view showing the example of the conventional lens actuator.

This example of the conventional lens actuator shown in FIG. 1 uses a single cylindrical coil as a focusing drive coil and two flat coils as tracking drive coils. An objective lens holder 2 holds an objective lens 1, and the objective lens holder 2 is resiliently supported by four wire springs 4 which are drawn out from a fixed member 3 which is provided on a substrate 7. A single cylindrical focusing drive coil 5 and two flat tracking drive coils 6 are provided around the objective lens holder 2. The focusing drive coil 5 and the two tracking drive coils 6 are wound in mutually perpendicular directions. The wire springs 4 are drawn out from the substrate 7 via the fixed member 3, and also function as conductor lines by being electrically connected to the coils 5 and 6 via solder portions 8 at ends of the wire springs 4. Magnets 10, each supported on a corresponding yoke 9, sandwich the objective lens holder 2, so that magnetic poles of the magnets 10 confront each other. Each magnet 10 is fixed to the corresponding yoke 9 via a gap, so that magnetic flux from the magnets 10 penetrate a driving portion of the coils 5 and 6.

The objective lens holder 2 is moved by applying a control current to each of the coils 5 and 6, and the objective lens 1 can be moved in a focusing direction (Z-axis direction) and in a tracking direction (Y-axis direction).

However, there are demands to further increase the recording density of optical disks. Consequently, as a beam spot of light used is made smaller and a numerical aperture (NA) of the objective lens becomes larger, a tilt tolerance of the objective lens becomes more severe. In the case of the conventional lens actuator shown in FIG. 1 employing a drive motor structure, the tilt that occurs when the objective lens 1 makes focusing and tracking operations introduces a big problem.

In other words, in the conventional optical disks such as the compact disk (CD), the wavelength of a laser beam used by an optical pickup is approximately 780 nm, and a track pitch of the optical disk is approximately 1.6 μm. Since the recording density on such an optical disk is relatively low, an optical inclination of the optical pickup with respect to the optical disk surface, that is, the tilt of the objective lens with respect to the optical disk surface, has a relatively large tolerance. For this reason, if the parts of the optical disk apparatus are manufactured with a precision to satisfy the designed manufacturing tolerance and assembled with a precision to satisfy the designed assembling tolerance, the assembled parts are positioned with a satisfactory precision which would not adversely affect the tilt, and the tilt does not become a problem.

However, in optical disks which have been developed recently, such as a digital versatile disk (DVD), the recording density is considerably increased compared to that of the CD. Hence, the wavelength of the laser beam used by the optical pickup in this case is approximately 650 nm, and the track pitch of the optical disk (DVD) is approximately 0.74 μm. As a result, the tilt of the optical pickup, particularly the objective lens, must be suppressed to approximately one-half that of the CD, and there are demands to satisfy such severe conditions.

For example, a Japanese Laid-Open Patent Application No.2001-34974 proposes an objective lens driving unit in which a center of each of two focusing drive coils in the tracking direction approximately matches a center of a magnetic field distribution in the tracking direction, so that a change in a driving force during a tracking operation is approximately the same for the two focusing drive coils. In addition, by making an absolute value of a moment about an axis in a jitter direction small, the tilt associated with focusing and tracking operations is considerably suppressed to such an extent that would satisfy the severe conditions demanded by high-recording-density optical disks such as the DVD.

On the other hand, an actuator which is used for active control must employ a movable mechanism which reduces, as much as possible, lost motion due to non-linearity or the like. For this reason, a Japanese Patent No.2856176 proposes a spring support structure for supporting a lens actuator which requires high-precision control.

In order to realize portable equipments and the like, there are demands in the field of recording and/or reproducing apparatuses to reduce the size, thickness and weight of the structure. Since the optical pickup is provided within the recording and/or reproducing apparatus, there are thus demands to further reduce the size, thickness and weight of the optical pickup and the actuator structure provided on the optical pickup for moving the objective lens.

In addition to the above described demands to reduce the size, thickness and weight of the recording and/or reproducing apparatus, there are also demands to increase the data processing speed and to reduce the cost of the apparatus. In order to meet such demands, it is necessary to reduce the size and weight of the structure of the movable section of the actuator, and to realize the actuator for active control, which generally is an expensive assembly, by a relatively simple structure. Moreover, the structure must enable easy assembly, and it is essential from the point of view of reducing the cost to take measures so that the characteristics are maintained and the generation of defective parts is prevented.

The above described demands to reduce the size, thickness and weight, increase the data processing speed, reduce the cost, and improve the performance are not only applicable to the field of the recording and/or reproducing apparatus, but also similarly applicable to other fields. In apparatuses related to optical disks, there are demands to realize a high-density recording and reproduction, high-quality recording and reproduction, and high-speed recording and reproduction. As described above, much progress is being made in the field of high-density recording and reproduction, and the progress is expected to accelerate when the wavelength of the laser beam is reduced and the NA of the objective lens is increased. But as a consequence, there is a new problem in that the signal deterioration becomes large with respect to the tilt of the objective lens.

In order to cope with this new problem, it is necessary to carry out an active drive correction in a roll direction which was conventionally for passive use, that is, in a radial tilt direction. However, an actuator which can be driven along three axes, that is, in the focusing direction, the tracking direction and the radial tilt direction, will become expensive because it is already difficult to mass produce the actuators which can be driven along two axes at a low cost.

Accordingly, there is a proposed arrangement which divides the focusing drive motor into two which are connected in parallel, so as to form a focusing drive motor portion and a radial tilt motor portion which are driven in the same phase and opposite phases. But in this case, the phase control of the two motor portions becomes complex. On the other hand, there is another proposed arrangement which provides, in addition to the actuator which can be driven along two axes, a joint member which joins the movable section and the fixed section and functions as a radial tilt actuator. But in this case, it is productionwise and costwise essentially the same as additionally providing an actuator which can be driven along a single axis.

A most easily conceivable structure is to provide additional coils for radial tilt on the actuator which can be driven along two axes. However, this conceivable structure requires magnets to be provided on the fixed section and the coils to be provided on the movable section, and the need to additionally provide such parts makes the assembling process more complex and increases the cost of the apparatus. Furthermore, the need to additionally provide such parts inevitably increases the number of required parts and makes the structure of the movable section complex, and may even deteriorate the characteristics of the actuator.

SUMMARY OF THE INVENTION

Accordingly, it is a general object of the present invention to provide a novel and useful lens actuator, optical pickup unit and optical disk apparatus, in which the problems described above are eliminated.

Another and more specific object of the present invention is to provide a lens actuator, an optical pickup unit and an optical disk apparatus which can move a lens along three independent axes with a high performance, using a small number of parts and a relatively simple structure which closely resembles as much as possible a lens actuator which is designed to move a lens along two axes, so as to prevent a stray tilt of the lens.

Still another and more specific object of the present invention is to provide a lens actuator comprising a lens holder to support an objective lens, the lens holder having a pair of first side surfaces in a tracking direction and a pair of second side surfaces in a tangential direction; wire springs, provided on the first side surfaces of the lens holder, to support the lens holder; a pair of fixed magnets disposed to confront the second side surfaces of the lens holder, each of the magnets having four regions which are defined by mutually perpendicular first and second magnetic boundary lines and have approximately the same area and are magnetic, such that magnetic directions of the four regions are perpendicular to a plane including a focusing direction and the tracking direction but are in opposite directions between two mutually adjacent regions, the first magnetic boundary line extending in the focusing direction, the second magnetic boundary line extending in the tracking direction; a pair of yokes having a predetermined thickness and having the corresponding magnets fixed thereon; first coils disposed between each second surface of the lens holder and each magnet and arranged on both sides of the first magnetic boundary line along the second magnetic boundary line of each magnet, the first coils being arranged symmetrically with respect to an optical axis of the objective lens; and second coils disposed between each second surface of the lens holder and each magnet and arranged on both sides of the second magnetic boundary line along the first magnetic boundary line of each magnet, the second coils being arranged symmetrically with respect to the optical axis of the objective lens, a first pair of diagonally arranged first coils generating thrusts in the same direction and a second pair of diagonally arranged first coils generating thrusts in mutually opposite directions, in response to power supplied independently thereto. According to the lens actuator of the present invention, it is possible to move the objective lens along three independent axes with a high performance, using a small number of parts and a relatively simple structure, so as to prevent a stray tilt of the objective lens.

A further object of the present invention is to provide an optical pickup unit comprising a light source to generate a light beam; an objective lens to converge the light beam from the light source on a recording medium; a lens actuator to move the objective lens, the lens actuator comprising: a lens holder to support the objective lens, the lens holder having a pair of first side surfaces in a tracking direction and a pair of second side surfaces in a tangential direction; wire springs, provided on the first side surfaces of the lens holder, to support the lens holder; a pair of fixed magnets disposed to confront the second side surfaces of the lens holder, each of the magnets having four regions which are defined by mutually perpendicular first and second magnetic boundary lines and have approximately the same area and are magnetic, such that magnetic directions of the four regions are perpendicular to a plane including a focusing direction and the tracking direction but are in opposite directions between two mutually adjacent regions, the first magnetic boundary line extending in the focusing direction, the second magnetic boundary line extending in the tracking direction; a pair of yokes having a predetermined thickness and having the corresponding magnets fixed thereon; first coils disposed between each second surface of the lens holder and each magnet and arranged on both sides of the first magnetic boundary line along the second magnetic boundary line of each magnet, the first coils being arranged symmetrically with respect to an optical axis of the objective lens; and second coils disposed between each second surface of the lens holder and each magnet and arranged on both sides of the second magnetic boundary line along the first magnetic boundary line of each magnet, the second coils being arranged symmetrically with respect to the optical axis of the objective lens; and a power supply section to supply power to the first and second coils so that the first coils generate thrusts in the focusing direction and the second coils generate thrusts in the tracking direction, the power supply section independently supplying the power a first pair of diagonally arranged first coils and a second pair of diagonally arranged first coils, so that the first pair of first coils generate thrusts in the same direction and the second pair of first coils generate thrusts in mutually opposite directions. According to the optical pickup unit of the present invention, it is possible to move the objective lens along three independent axes with a high performance, using a small number of parts and a relatively simple structure, so as to prevent a stray tilt of the objective lens.

Another object of the present invention is to provide an optical disk apparatus to record and/or reproduce information to and/or from an optical disk by a light beam, comprising a light source to generate the light beam; an objective lens to converge the light beam from the light source on optical disk; a lens actuator to move the objective lens, the lens actuator comprising: a lens holder to support the objective lens, the lens holder having a pair of first side surfaces in a tracking direction and a pair of second side surfaces in a tangential direction; wire springs, provided on the first side surfaces of the lens holder, to support the lens holder; a pair of fixed magnets disposed to confront the second side surfaces of the lens holder, each of the magnets having four regions which are defined by mutually perpendicular first and second magnetic boundary lines and have approximately the same area and are magnetic, such that magnetic directions of the four regions are perpendicular to a plane including a focusing direction and the tracking direction but are in opposite directions between two mutually adjacent regions, the first magnetic boundary line extending in the focusing direction, the second magnetic boundary line extending in the tracking direction; a pair of yokes having a predetermined thickness and having the corresponding magnets fixed thereon; first coils disposed between each second surface of the lens holder and each magnet and arranged on both sides of the first magnetic boundary line along the second magnetic boundary line of each magnet, the first coils being arranged symmetrically with respect to an optical axis of the objective lens; and second coils disposed between each second surface of the lens holder and each magnet and arranged on both sides of the second magnetic boundary line along the first magnetic boundary line of each magnet, the second coils being arranged symmetrically with respect to the optical axis of the objective lens; and a power supply section to supply power to the first and second coils so that the first coils generate thrusts in the focusing direction and the second coils generate thrusts in the tracking direction, the power supply section independently supplying the power a first pair of diagonally arranged first coils and a second pair of diagonally arranged first coils, so that the first pair of first coils generate thrusts in the same direction and the second pair of first coils generate thrusts in mutually opposite directions. According to the optical disk apparatus of the present invention, it is possible to move the objective lens along three independent axes with a high performance, using a small number of parts and a relatively simple structure, so as to prevent a stray tilt of the objective lens.

Still another object of the present invention is to provide a lens actuator comprising a lens holder to support an objective lens, the lens holder having a pair of first side surfaces in a tracking direction and a pair of second side surfaces in a tangential direction; a fixed magnet disposed to confront the second side surface of the lens holder, the magnet comprising four regions having approximately the same area and are magnetic, such that magnetic directions of the four regions are perpendicular to a plane including a focusing direction and the tracking direction but are in opposite directions between two mutually adjacent regions; a pair of tracking coils disposed between the second surface of the lens holder and the magnet and having centers located on an outer side of corresponding centers of the four regions of each magnet in the tracking direction, the pair of tracking coils being arranged symmetrically with respect to an optical axis of the objective lens; a focusing coil disposed between the second surface of the lens holder and the magnet, and having a center located on an outer side of corresponding centers of the four regions of the magnet in the focusing direction; and a radial tilt coil disposed between the second surface of the lens holder and the magnet, and having a center located on an outer side of corresponding centers of the four regions of the magnet in the focusing direction. According to the lens actuator of the present invention, it is possible to move the objective lens along three independent axes with a high performance, using a small number of parts and a relatively simple structure, so as to prevent a stray tilt of the objective lens.

A further object of the present invention is to provide an optical pickup unit comprising a light source to generate a light beam; an objective lens to converge the light beam from the light source on a recording medium; a lens actuator to move the objective lens, the lens actuator comprising: a lens holder to support the objective lens, the lens holder having a pair of first side surfaces in a tracking direction and a pair of second side surfaces in a tangential direction; a fixed magnet disposed to confront the second side surface of the lens holder, the magnet comprising four regions having approximately the same area and are magnetic, such that magnetic directions of the four regions are perpendicular to a plane including a focusing direction and the tracking direction but are in opposite directions between two mutually adjacent regions; a pair of tracking coils disposed between the second surface of the lens holder and the magnet and having centers located on an outer side of corresponding centers of the four regions of each magnet in the tracking direction, the pair of tracking coils being arranged symmetrically with respect to an optical axis of the objective lens; a focusing coil disposed between the second surface of the lens holder and the magnet, and having a center located on an outer side of corresponding centers of the four regions of the magnet in the focusing direction; and a radial tilt coil disposed between the second surface of the lens holder and the magnet, and having a center located on an outer side of corresponding centers of the four regions of the magnet in the focusing direction; and a power supply section to supply power to the tracking coils, the focusing coil and the radial tilt coil so that the tracking coils generate thrusts in the tracking direction and the focusing coil and the radial tilt coil generate thrusts in the focusing direction, the power supply section independently supplying the power to the focusing coil and the radial tilt coil. According to the optical pickup unit of the present invention, it is possible to move the objective lens along three independent axes with a high performance, using a small number of parts and a relatively simple structure, so as to prevent a stray tilt of the objective lens.

Another object of the present invention is to provide an optical disk apparatus to record and/or reproduce information to and/or from an optical disk by a light beam, comprising a light source to generate the light beam; an objective lens to converge the light beam from the light source on the optical disk; a lens actuator to move the objective lens, the lens actuator comprising: a lens holder to support the objective lens, the lens holder having a pair of first side surfaces in a tracking direction and a pair of second side surfaces in a tangential direction; a fixed magnet disposed to confront the second side surface of the lens holder, the magnet comprising four regions having approximately the same area and are magnetic, such that magnetic directions of the four regions are perpendicular to a plane including a focusing direction and the tracking direction but are in opposite directions between two mutually adjacent regions; a pair of tracking coils disposed between the second surface of the lens holder and the magnet and having centers located on an outer side of corresponding centers of the four regions of each magnet in the tracking direction, the pair of tracking coils being arranged symmetrically with respect to an optical axis of the objective lens; a focusing coil disposed between the second surface of the lens holder and the magnet, and having a center located on an outer side of corresponding centers of the four regions of the magnet in the focusing direction; and a radial tilt coil disposed between the second surface of the lens holder and the magnet, and having a center located on an outer side of corresponding centers of the four regions of the magnet in the focusing direction; and a power supply section to supply power to the tracking coils, the focusing coil and the radial tilt coil so that the tracking coils generate thrusts in the tracking direction and the focusing coil and the radial tilt coil generate thrusts in the focusing direction, the power supply section independently supplying the power to the focusing coil and the radial tilt coil. According to the optical disk apparatus of the present invention, it is possible to move the objective lens along three independent axes with a high performance, using a small number of parts and a relatively simple structure, so as to prevent a stray tilt of the objective lens.

Other objects and further features of the present invention will be apparent from the following detailed description when read in conjunction with the accompanying drawings.

DESCRIPTION OF THE PREFERRED EMBODIMENTS

Figure 2:
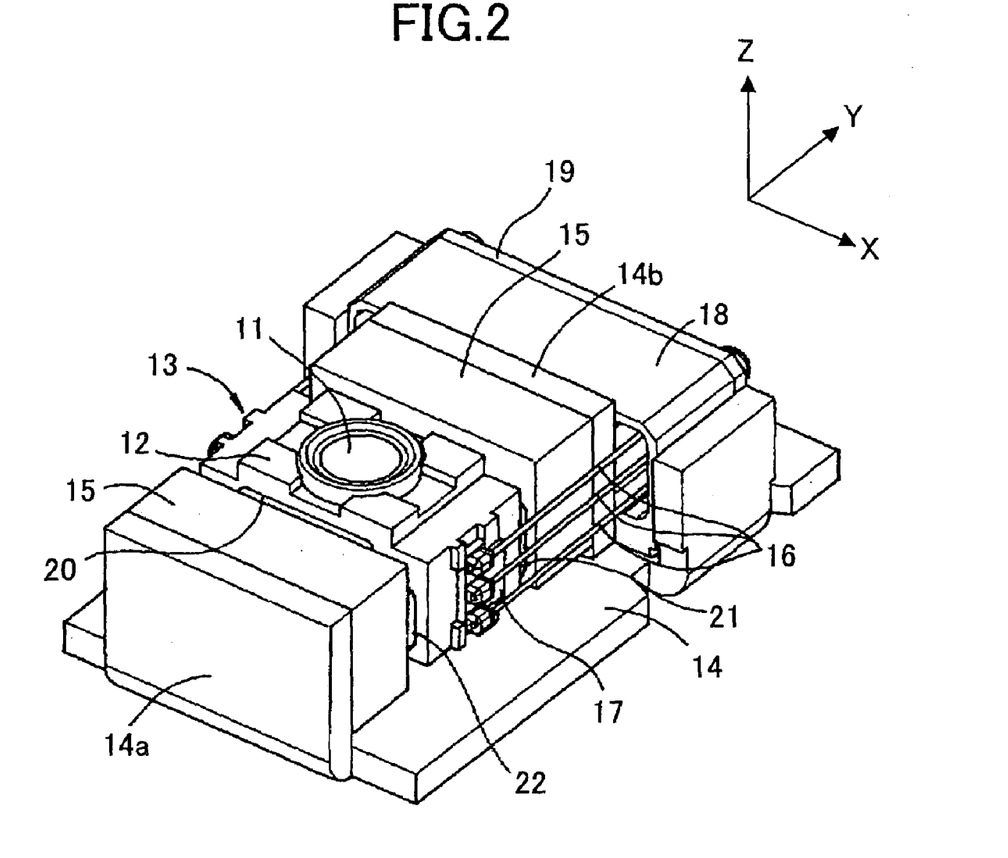
FIG. 2 is a perspective view showing an embodiment of a lens actuator according to the present invention.

FIG. 2 is a perspective view showing an embodiment of a lens actuator according to the present invention. The lens actuator shown in FIG. 2 includes an objective lens 11, an objective lens holder 12, a movable section 13, a base body made of an iron or iron-alloy magnetic material, plate-shaped magnets 15, wire springs 16, printed circuit boards 17, a fixed member 18, a printed circuit board 19, tracking coils 20, focusing coils 21, and radial tilt coils 22.

The objective lens 11 is held by an upper portion of the lens holder 12. A plurality of wire springs 16, which function as resilient support members, are provided on each side of the lens holder 12. In this embodiment, three wire springs 16 are provided on each side of the lens holder 12 and six wire springs 16 are provided in total.

The printed circuit board 17 is used for fixing ends of the wire springs 16 and for supplying power to the coils 20, 21 and 22 via the wire springs 16. The printed circuit board 19 is used for supplying power to the wire springs 16.

The movable section 13 is constructed so that an activating center thereof matches an optical axis of the objective lens 11. The movable section 13 has the printed circuit boards 17 provided on both sides confronting each other in a radial direction (or tracking direction), and has the tracking coils 20, the focusing coils 21 and the radial tilt coils 22 provided on respective sides confronting each other in a tangential direction. The radial direction (or tracking direction) refers to a radial direction of an optical disk (not shown) which will be described later. The tangential direction refers to a direction tangent to a track on the optical disk, and this tangential direction is perpendicular to the radial direction (or tracking direction).

The base body 14 has walls 14a and 14b which have a predetermined thickness and confront each other in the tangential direction. The magnets 15 are fixed on the walls 14a and 14b so as to confront each other via the movable section 13. Hence, the walls 14 and 14b form yokes of a fixed magnetic circuit.

As shown in FIG. 2, the fixed member 18 is provided on a surface of the wall 14b opposite to a surface of the wall 14b provided with the magnet 15. Hence the lens holder 12 is arranged between the walls 14a and 14b, and the tracking coil 20, the focusing coil 21 and the radial tilt coil 22 confront the corresponding magnets 15. As a result, drive motors for moving the movable section 13 are formed by the combination of the tracking coils 20, the focusing coils 21, the radial tilt coils 22 and the magnets 15. Since eight coils 20 through 22 are used in this embodiment, eight drive motors re formed.

One end of each wire spring 16 is connected and fixed by soldering to the corresponding printed circuit board 17, and the other end of each wire spring 16 is connected and fixed by soldering to the printed circuit board 19 which is provided on the fixed member 18, via a hole in the fixed member 18. As a result, each side of the movable section 13 is supported on the fixed member 18 via three wire springs 16, and the movable section 13 is supported by a total of six wire springs 16. Each of the tracking coils 20, the focusing coils 21 and the radial tilt coils 22 is electrically connected to two wire springs 16 and is supplied with power via the two wire springs 16.

Figure 3:
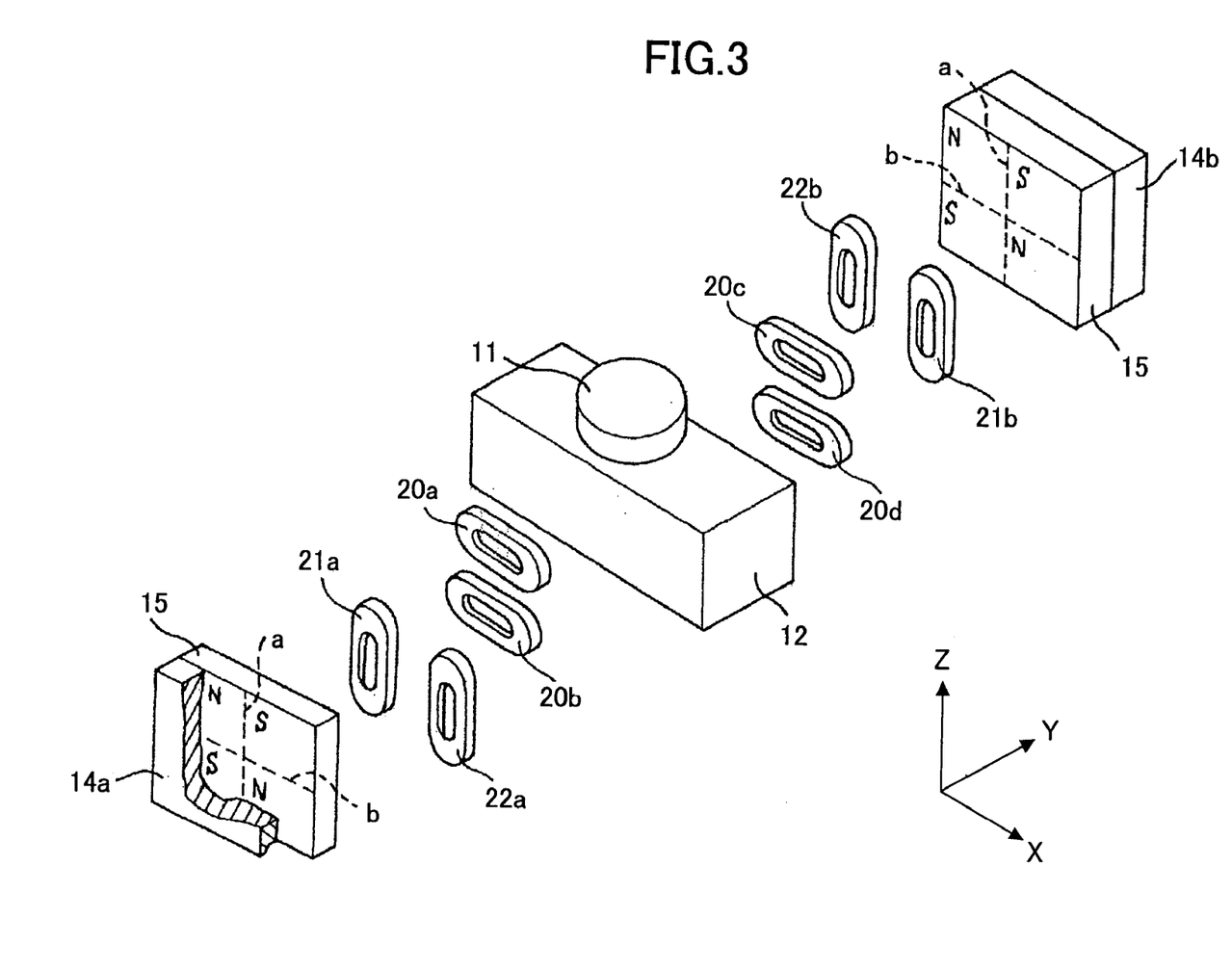
FIG. 3 is a disassembled perspective view showing a structure drive motors.

FIG. 3 is a disassembled perspective view showing a structure the drive motors. As shown in FIG. 3, the tracking coils 20 are ring-shaped solenoid coils which are elongated in the radial direction, and are arranged in parallel on both the top and bottom of the lens holder 12. The focusing coils 21 and the radial tilt coils 22 are ring-shaped solenoid coils which are elongated in the focusing direction, and are arranged on opposite ends of the tracking coils 20 along the radial direction. The focusing direction refers to a direction approximately parallel to the optical axis of the objective lens 11, that is, approximately perpendicular to the recording surface of the optical disk. Each of the tracking coils 20, the focusing coils 21 and the radial tilt coils 22 is wound about an axis along the tangential direction, and has a specification which is common for each of the coils 20, 21 and 22.

In the following description, the tracking coil 20 located at an upper portion of the surface of the lens holder 12 opposing the wall 14a is denoted by a reference numeral 20a, and the tracking coil 20 located at a lower portion of the surface of the lens holder 12 opposing the wall 14a is denoted by a reference numeral 20b. In addition, the focusing coil 21 located above the tracking coils 20a and 20b is denoted by a reference numeral 21a, and the radial tilt coil 22 located above the tracking coils 20a and 20b is denoted by a reference numeral 22a.

Similarly, the tracking coil 20 located at an upper portion of the surface of the lens holder 12 opposing the wall 14b is denoted by a reference numeral 20c, and the tracking coil 20 located at a lower portion of the surface of the lens holder 12 opposing the wall 14b is denoted by a reference numeral 20d. In addition, the focusing coil 21 located below the tracking coils 20c and 20d is denoted by a reference numeral 21b, and the radial tilt coil 22 located below the tracking coils 20c and 20d is denoted by a reference numeral 22b.

Each magnet 15 has a generally parallelepiped shape which has a square shape when viewed in the tangential direction. The magnet 15 is divided into four regions by intersecting magnetic boundary lines "a" and "b" which are mutually perpendicular and pass through a center of the magnet 15. The magnetic boundary line "a" extends in the focusing direction, and the magnetic boundary line "b" extends in the tracking direction. In other words, the areas of the four regions of the magnet 15 are approximately the same and preferably identical. Each of the four regions of the magnet 15 is magnetic, and the magnetic directions of the four regions are perpendicular to a plane including the focusing direction and the tracking direction but are in opposite directions between two mutually adjacent regions.

When the movable section 13 is mounted on the fixed section 18 via the wire springs 16, the magnets 15, the tracking coils 20, the focusing coils 21 and the radial tilt coils 22 are arranged symmetrically with respect to an imaginary plane defined by a focusing axis and a tracking axis of the objective lens 11. The tracking coils 20, the focusing coils 21 and the radial tilt coils 22 are arranged to confront the respective magnets 15, so that the magnetic boundary line "a" is located at the central portion of each of the tracking coils 20 and the magnetic boundary line "b" is located at the central portion of each of the focusing coils 21 and the radial tilt coils 22.

The power to the tracking coils 20, the power to the focusing coils 21 and the power to the radial tilt coils 22 are independently supplied via the respective wire springs 16. When the power is supplied to each of the tracking, focusing and radial tilt coils 20, 21 and 22, the focusing coils 21 and the radial tilt coils 22 generate a thrust in a vertical direction (up-and-down direction or focusing direction), and the tracking coils 20 generate a thrust in a horizontal direction (tracking direction. When the power is supplied to each the focusing coils 21a and 21b, the thrusts are generated in the same direction, and the objective lens 11 is moved along the focusing direction. However, when the power is supplied to each of the radial tilt coils 22a and 22b, thrusts are generated in mutually opposite directions, to thereby generate a radial tilt torque and tilt the objective lens 11. An amount of tilt of the optical axis of the objective lens 11 is controlled by a current which is applied to the focusing coils 21a and 21b.

FIGS. 4A through 4E are diagrams for explaining the structure of the drive motors. In FIGS. 4A through 4E, those parts which are the same as those corresponding parts in FIGS. 2 and 3 are designated by the same reference numerals, and a description thereof will be omitted.

Figure 4A:
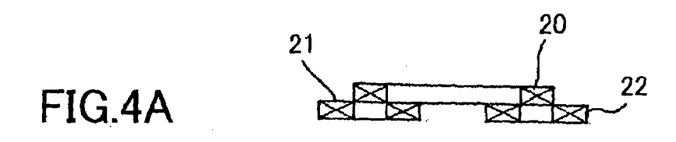
FIGS. 4A through 4E are diagrams for explaining the structure of the drive motors.
Figures 4B, 4C, 4D, 4E:
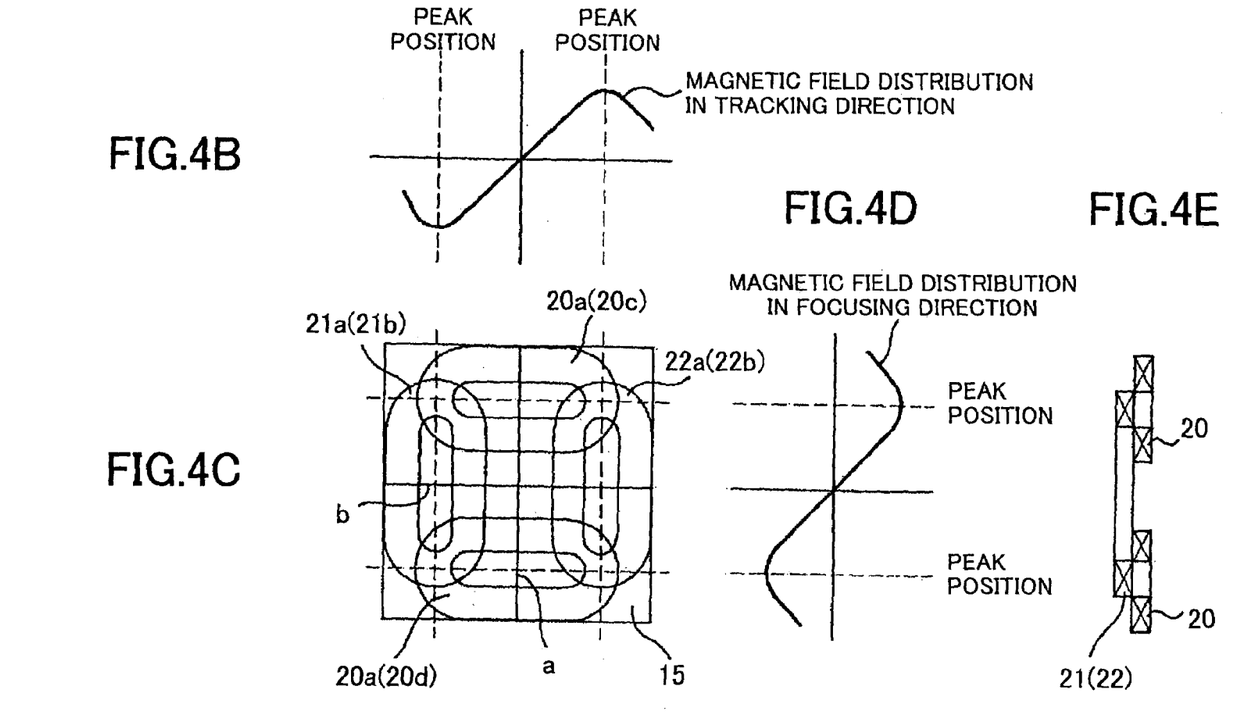

FIG. 4A shows a horizontal cross section of the coils 20, 21 and 22 viewed from the focusing direction, and FIG. 4B shows a magnetic field distribution in the tracking direction. FIG. 4C shows a front view for explaining a positional relationship of the coils 20, 21 and 22 and the driving magnets 15, and FIG. 4D shows a magnetic field distribution in the focusing direction. FIG. 4E shows a side view in vertical cross section of the coils 20, 21 and 22 viewed from the tracking direction. In FIGS. 4A through 4E, it is assumed for the sake of convenience that the specifications of the tracking coils 20, the focusing coils 21 and the radial tilt coils 22 are the same.

The magnetic field distribution (magnetic flux density distribution) which is generated within the plane in which the coils 20, 21 and 22 are arranged by the magnetic circuit formed by the wall 14a (or 14b) and the magnet 15 becomes as shown in FIG. 4B with respect to the tracking direction and as shown in FIG. 4D with respect to the focusing direction. In other words, peak positions in the two magnetic field distributions shown in FIGS. 4B and 4D are located on the outer side of the geometrical center positions of the four regions of the magnets 15 as may be seen by comparing FIG. 4C to FIGS. 4B and 4D, because the magnetic directions (directions of the magnetic fields) of two mutually adjacent regions of each of the magnets 15 are mutually opposite.

Because the peak positions in the two magnetic field distributions are deviated from the centers of the four regions of the magnets 15, this embodiment arranges the focusing coils 21 and the radial tilt coils 22 so that the centers of these coils 21 and 22 in the tracking direction match the corresponding peak positions in the magnetic field distribution shown in FIG. 4B. More particularly, the centers of the focusing coils 21a and 21b in the tracking direction shown in FIGS. 4A and 4C match the peak position in the magnetic field distribution in the tracking direction shown in FIG. 4B, and the centers of the radial tilt coils 22a and 22b in the tracking direction shown in FIGS. 4A and 4C match the peak position in the magnetic field distribution in the tracking direction shown in FIG. 4B.

Similarly, this embodiment arranges the tracking coils 20 so that the centers of these coils 20 in the focusing direction match the corresponding peak positions in the magnetic field distribution shown in FIG. 4D. More particularly, the centers of the tracking coils 20a and 20c in the focusing direction shown in FIGS. 4C and 4E match the peak position in the magnetic field distribution in the focusing direction shown in FIG. 4D, and the centers of the tracking coils 20b and 20d in the focusing direction shown in FIGS. 4C and 4E match the peak position in the magnetic field distribution in the focusing direction shown in FIG. 4D.

In other words, the positions of the focusing coils 21 and the radial tilt coils 22 are set so that the centers of the focusing coils 21 and the radial tilt coils 22 in the tracking direction are located on the outer side of the geometrical center positions of the four regions of each of the magnets 15 in the tracking direction. Furthermore, the positions of the tracking coils 20 are set so that the centers of the tracking coils 20 in the focusing direction are located on the outer side of the geometrical center positions of the four regions of each of the magnets 15 in the focusing direction. The size of each of the coils 20, 21 and 22 is such that each of the coils 20, 21 and 22 are approximately accommodated within a projection area of the magnet 15 in the tangential direction.

Of course, the centers of the coils 20, 21 and 22 may approximately match the respective peak positions in the corresponding magnetic field distributions shown in FIGS. 4B and 4D, although an exact match is preferred.

Therefore, when moving the movable section 13 for the tracking, the (focusing) driving forces of the focusing coils 21 and the radial tilt coils 22 vary by approximately the same amount, because the centers of the focusing coils 21 and the radial tilt coils 22 in the tracking direction match the peak positions in the magnetic field distribution in the tracking direction shown in FIG. 4B. Hence, it is possible to suppress an absolute value of a moment which is generated by a difference between the driving forces of the two focusing coils 22 to a small value, so that the object lens 11 will not easily tilt.

Similarly, when moving the movable section 13 for the focusing, the (tracking) driving forces of the tracking coils 20 vary by approximately the same amount, because the centers of the tracking coils 20 in the focusing direction match the peak positions in the magnetic field distribution in the focusing direction shown in FIG. 4D. Hence, it is possible to suppress an absolute value of a moment which is generated by a difference between the driving forces of the two tracking coils 20 to a small value, so that the object lens 11 will not easily tilt.

FIGS. 5A through 5E are diagrams for explaining another structure of the drive motors. In FIGS. 5A through 5E, those parts which are basically the same as those corresponding parts in FIGS. 4A through 4E are designated by the same reference numerals, and a description thereof will be omitted.

Figure 5A:
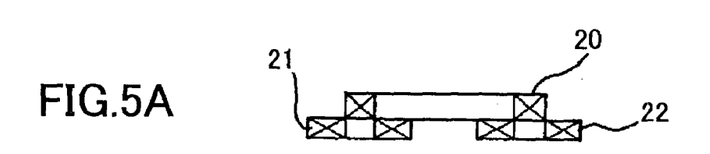
FIGS. 5A through 5E are diagrams for explaining another structure of the drive motors.
Figures 5B, 5C, 5D, 5E:
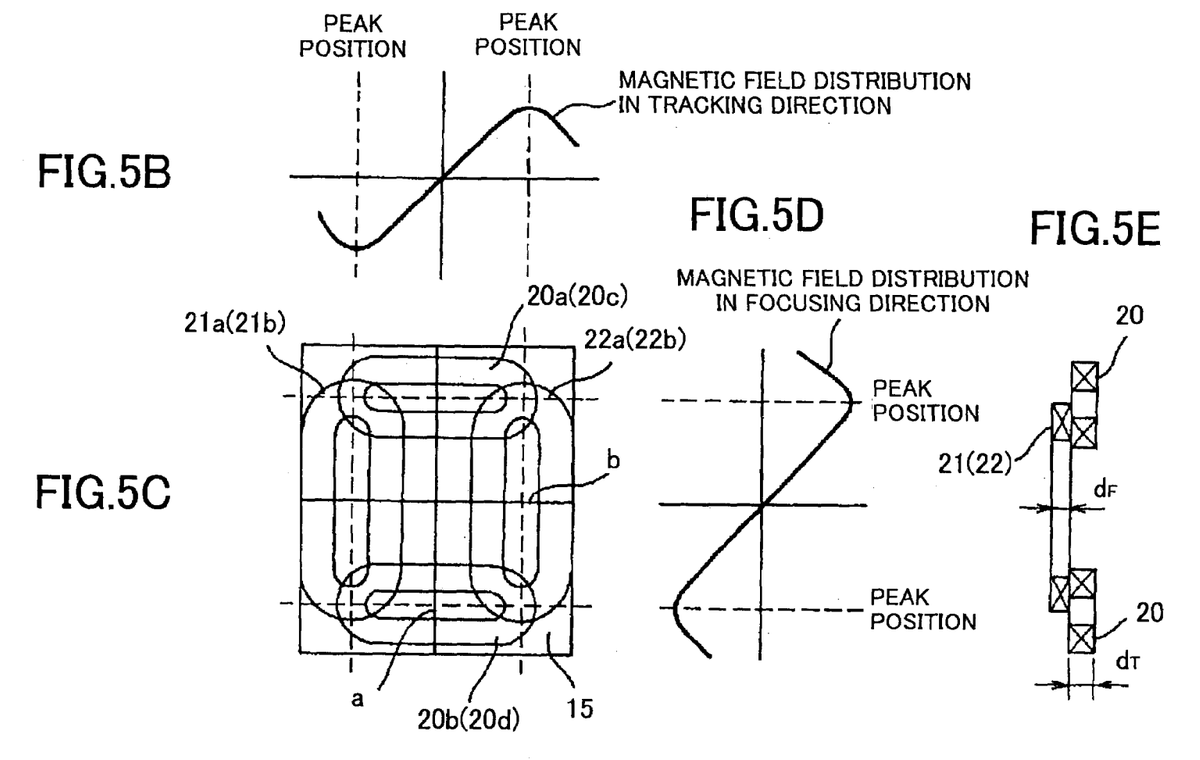

FIG. 5A shows a horizontal cross section of the coils 20, 21 and 22 viewed from the focusing direction, and FIG. 5B shows a magnetic field distribution in the tracking direction. FIG. 5C shows a front view for explaining a positional relationship of the coils 20, 21 and 22 and the driving magnets 15, and FIG. 5D shows a magnetic field distribution in the focusing direction. FIG. 5E shows a side view in vertical cross section of the coils 20, 21 and 22 viewed from the tracking direction. In FIGS. 5A through 5E, it is assumed for the sake of convenience that the specifications of the focusing coils 21 and the radial tilt coils 22 are the same, but the specifications of the tracking coils 20 are different from those of the coils 21 and 22.

According to the structure shown in FIGS. 5A through 5E, the projection area of the tracking coil 20 with respect to a moving plane (XZ-plane defined by the X-axis and the Z-axis shown in FIG. 3) is smaller than the projection area of each of the focusing coil 21 and the radial tilt coil 22 with respect to the moving plane. Hence, a moment generated by the tracking coils 20 and the focusing coils 21 and a moment generated by the tracking coils 20 are mutually cancelled, so as to minimize the tilt of the objective lens 11.

In other words, the external shape of the magnet 15 is not square, but is elongated and longer in the focusing direction than in the tracking direction as shown in FIG. 5C. In addition, as shown in FIGS. 5A and 5E, a thickness dT of the tracking coil 20 is larger than a thickness dF of the focusing coil 21 in a jitter direction (=tangential direction=Y-axis direction). Furthermore, a coil wire material used for the tracking coil 20 is thinner (smaller in cross sectional area) than a coil wire material used for the focusing coil 21 and the radial tilt coil 22.

Because the tracking coil 20 is thicker than the focusing coil 21 along the jitter direction and the coil wire material used for the tracking coil 20 is thinner than that used for the focusing coil 21 and the radial tilt coil 22, the coil projection area of the tracking coil 20 is smaller than that of each of the focusing coil 21 and the radial tilt coil 22. In addition, since the external shape of the magnet 15 is elongated and longer in the focusing direction than in the tracking direction, the absolute value of the moment generated by the focusing coils 21 and the radial tilt coils 22 becomes approximately the same as the absolute value of the moment generated by the tracking coils 20, to thereby suppress the tilt of the objective lens 11 from being generated.

Therefore, according to this embodiment, the lens actuator can be formed using parts similar to those used by the objective lens driving unit proposed in the Japanese Laid-Open Patent Application No.2001-34974 described above, although two more wire springs are required in the case of this embodiment. Hence, this embodiment can prevent a stray tilt of the objective lens when carrying out the focusing and the tracking, and additionally provide the function of radial tilt drive. Of course, the movable section may be moved by use of a single drive motor, but in this case, an offset is generated between the optical axis of the objective lens and a thrust center. Thus, from the point of view of stabilizing the characteristics, it is desirable to arranged one pair of drive motors at symmetrical positions about the objective lens.

Of the four coils which can generate the thrust in the focusing direction, two diagonally arranged coils at symmetrical positions with respect to the optical axis of the objective lens are used as the focusing coils, and two remaining diagonally arranged coils at symmetrical positions with respect to the optical axis of the objective lens are used as the radial tilt coils. Accordingly, it is possible to realize a 3-axis actuator having a high linearity and satisfying the Abbe's theory.

Moreover, by using the same specification for two or all of the three kinds of coils, namely, the tracking coils, the focusing coils and the radial tilt coils, it is possible to realize a lens actuator which is easy to manufacture.

Next, a description will be given of an embodiment of an optical disk apparatus according to the present invention.

Figure 6:
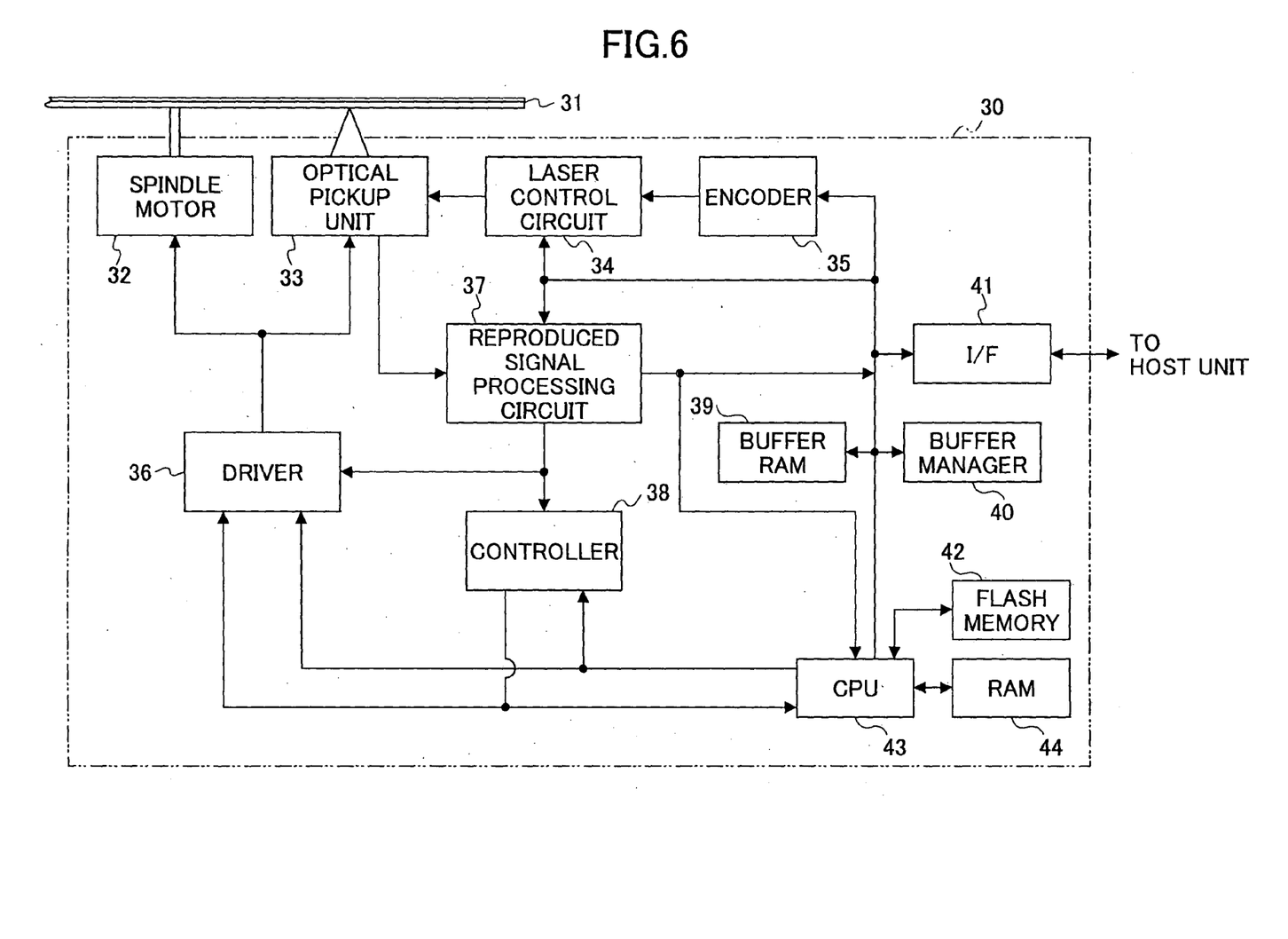
FIG. 6 is a system block diagram showing an embodiment of an optical disk apparatus according to the present invention.

FIG. 6 is a system block diagram showing this embodiment of the optical disk apparatus according to the present invention. An optical disk apparatus 30 shown in FIG. 6 includes a spindle motor 32 for rotating an optical disk (information recording medium) 31, an optical pickup unit 33, a laser control circuit 34, an encoder 35, a driver 36, a reproduced signal processing circuit 37, a controller 38, a buffer RAM 39, a buffer manager 40, an interface 41, a flash memory 42, a CPU 43 and a RAM 44. Signal lines and arrows indicating the flow of signals in FIG. 6 merely show representative signals and signal flows, and do not show all of the connections of the elements forming the optical disk apparatus 30. In addition, it is assumed for the sake of convenience that the optical disk 31 is in conformance with the DVD system standard.

The optical pickup unit 33 irradiates a laser beam at a predetermined position on a recording surface of the optical disk 31 which has a spiral track (region) or concentric tracks (regions) on the recording surface. The optical pickup unit 33 also receives the laser beam which is reflected by the recording surface of the optical disk 31. A description of the structure of the optical pickup unit 33 will be given later in the specification.

Figure 7:
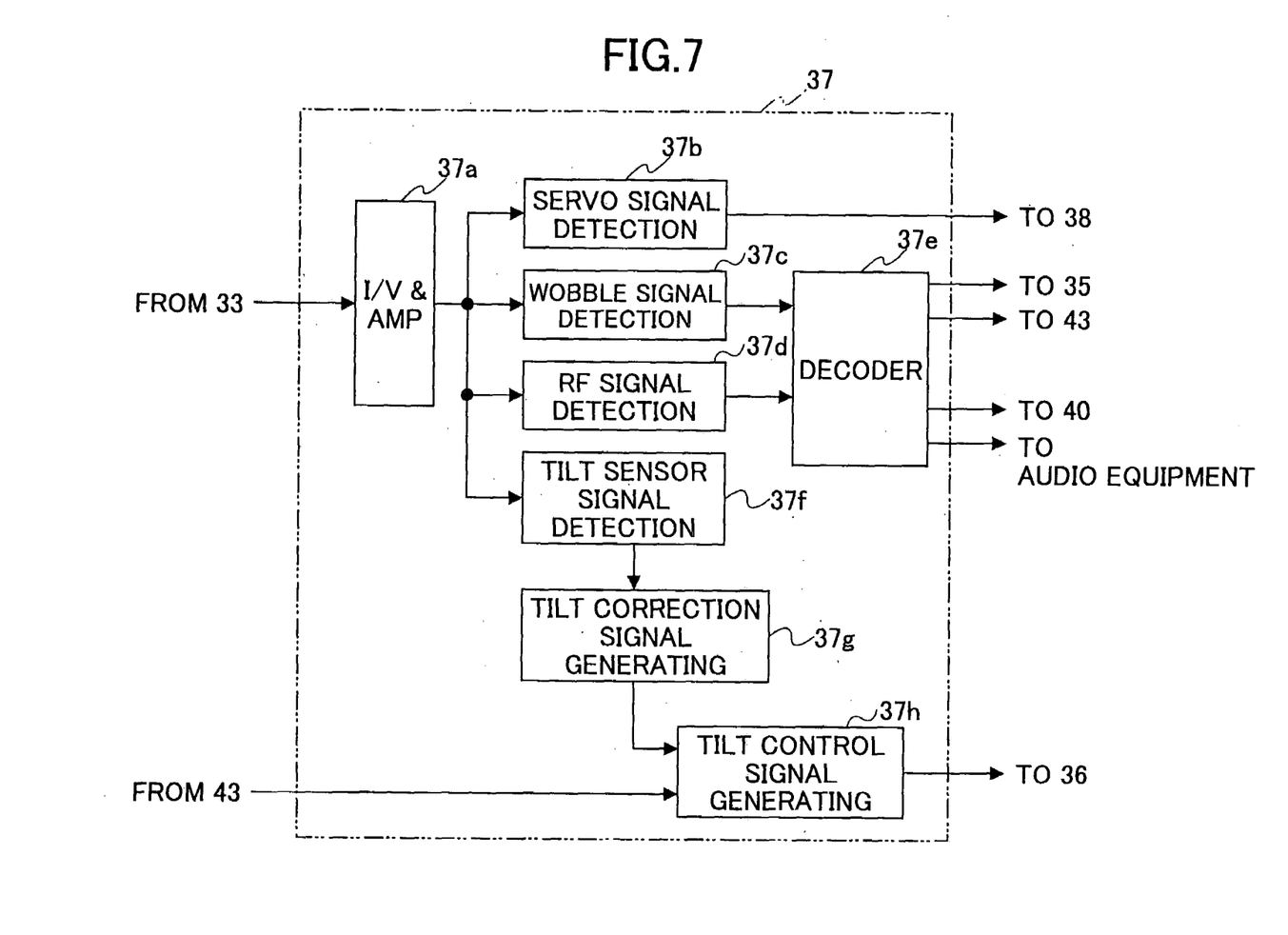
FIG. 7 is a system block diagram showing a structure of a reproduced signal processing circuit.

FIG. 7 is a system block diagram showing a structure of the reproduced signal processing circuit 37. The reproduced signal processing circuit 37 shown in FIG. 7 includes a current-to-voltage (I/V) converter and amplifier 37a, a servo signal detection circuit 37b, a wobble signal detection circuit 37c, an RF signal detection circuit 37d, a decoder 37e, a tilt sensor signal detection circuit 37f, a tilt correction signal generating circuit 37g, and a tilt control signal generating circuit 37h.

The I/V converter and amplifier 37a converts an output current signal of the optical pickup unit 33 into a voltage signal and amplifies the voltage signal by a predetermined gain. The servo signal detection circuit 37b detects servo signals, such as a focus error signal and a tracking error signal, based on the voltage signal output from the I/V converter and amplifier 37a. The detected servo signals are output to the controller 38 shown in FIG. 6.

The wobble signal detection circuit 37c detects a wobble signal based on the voltage signal output from the I/V converter and amplifier 37a. The RF signal detection circuit 37d detects an RF signal based on the voltage signal output from the I/V converter and amplifier 37a. The decoder 37e extracts Address In Pregroove (ADIP) information, a synchronizing signal and the like from the wobble signal which is detected by the wobble signal detection circuit 37c. The extracted ADIP information is output to the CPU 43 shown in FIG. 6, and the extracted synchronizing signal is output to the encoder 35 shown in FIG. 6. The decoder 37e also carries out a decoding process, an error correction process and the like with respect to the RF signal which is detected by the RF signal detection circuit 37d, and stores reproduced data in the buffer RAM 39 shown in FIG. 6 via the buffer manager 40. In a case where the reproduced data are music data, the reproduced data are output to an external audio equipment or the like.

Figure 8:
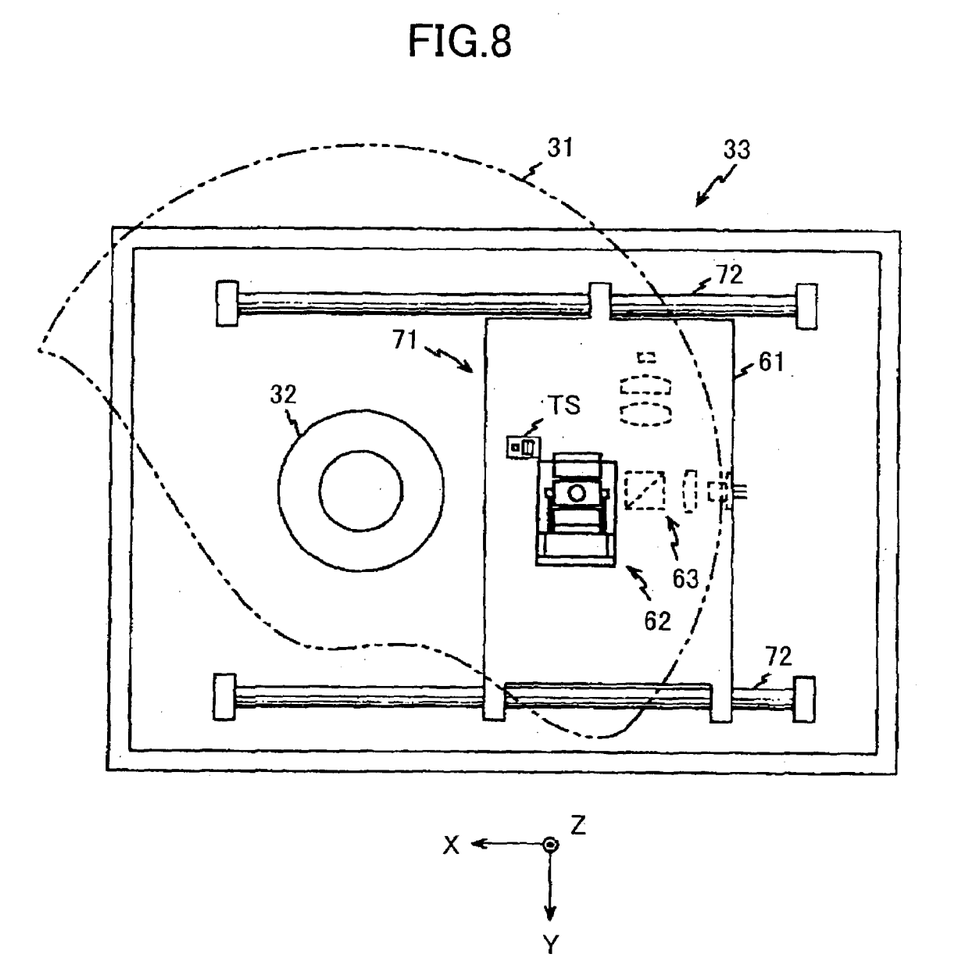
FIG. 8 is a diagram showing an embodiment of an optical pickup unit according to the present invention.

The tilt sensor signal detection circuit 37f detects a tilt sensor signal corresponding to an amount of tilt, based on an output signal of a tilt sensor TS shown in FIG. 8 which will be described later. The tilt correction signal generating circuit 37g generates a tilt correction signal for correcting the tilt, based on the tilt sensor signal which is detected by the tilt sensor signal detection circuit 37f, and outputs the tilt correction signal to the tilt control signal generating circuit 37h. The tilt control signal generating circuit 37h amplifies the incoming tilt correction signal by a predetermined gain, and outputs a tilt control signal Sout to the driver 36 shown in FIG. 6.

The controller 38 shown in FIG. 6 generates a focus control signal for correcting the focus error, based on the focus error signal from the reproduced signal processing circuit 37. The controller 38 also generates a tracking control signal for correcting the tracking error, based on the tracking error signal from the reproduced signal processing circuit 37. The focus control signal and the tracking control signal are output to the driver 36.

The driver 36 outputs to the optical pickup unit 33 a focus drive current dependent on the focus control signal from the controller 38 and a tracking drive current dependent on the tracking control signal from the controller 38. The driver 36 also outputs to the optical pickup unit 33 a tilt drive current dependent on the tilt control signal from the tilt control signal generating circuit 37h and a seek drive signal dependent on a seek control signal from the CPU 43. The optical pickup unit 33 is provided with the lens actuator described above with reference to FIGS. 2 through 5E, and this lens actuator is driven by the focus drive current, the tracking drive current and the tilt drive current supplied from the driver 36. The driver 36 further outputs a drive signal to the spindle motor 32 based on an instruction from the CPU 43.

The buffer manager 40 manages input and output of data to and from the buffer RAM 39, and notifies the CPU 43 when an amount of data stored in the buffer RAM 39 reaches a predetermined amount.

The encoder 35 obtains the data stored in the buffer RAM 39 via the buffer manager 40 based on an instruction from the CPU 43, and carries out a process such as modulation and addition of an error correction code with respect to the obtained data, so as to generate a write signal with respect to the optical disk 31. The encoder 35 outputs the write signal to the laser control circuit 34 in synchronism with the synchronizing signal from the reproduced signal processing circuit 37.

The laser control circuit 34 outputs to the optical pickup unit 33 a laser diode (LD) control signal for controlling an output of the laser beam to be irradiated on the optical disk 31, based on the write signal from the encoder 35 and an instruction from the CPU 43.

The interface 41 provides a bi-directional communication interface between the optical disk apparatus 30 and a host unit (not shown) such as a personal computer. In this embodiment, the interface 41 is in conformance with the AT Attachment Packet Interface (ATAPI) standard.

A program which is written in codes decodable by the CPU 43 is stored in the flash memory 42. The CPU 43 controls the operation of the various parts of the optical disk apparatus 30 described above according to the program stored in the flash memory 42. The CPU 43 temporarily stores data required for the control and the like in the RAM 44.

In the optical disk apparatus 30, it is possible to correct the radial tilt of the optical disk 31 when recording information on and/or reproducing information from the optical disk 31 in conformance with the DVD standard such as the DVD+RW/+R and DVD-R/RW.

Next, a description will be given of the structure of the optical pickup unit 33, by referring to FIG. 8. FIG. 8 is a diagram showing an embodiment of an optical pickup unit according to the present invention. As shown in FIG. 8, the optical pickup unit 33 includes a pickup main body 71, two seek rails 72, a seek motor (not shown), and the tilt sensor TS. The pickup main body 71 irradiates the laser beam on the recording surface of the optical disk 31 which is rotated by the spindle motor 32, and receives the laser beam reflected by the recording surface of the optical disk 31. The seek rails 72 supports the pickup main body 71, and guide a movement of the pickup main body 71 in an X-axis direction, that is, in rightward and leftward directions in FIG. 8. The seek motor drives the pickup main body 71 in the X-axis direction. The tilt sensor TS detects the tilt of the objective lens 11 with respect to the optical disk 31. In FIG. 8, a Y-axis direction (upward and downward direction) is perpendicular to the X-axis direction. In addition, a Z-axis direction (directions perpendicular to the paper in FIG. 8) is perpendicular to the X-axis direction and the Y-axis direction.

The pickup main body 71 includes a housing 61, a converging system 62, and a light output system 63. The light output system 63 is accommodated within the housing 61, and outputs the laser beam to be irradiated on the recording surface of the optical disk 31. The laser beam output from the light output system 63 is converged at a predetermined position on the recording surface of the optical disk 31 by the converging system 62 which is provided on the housing 61.

Figure 9:
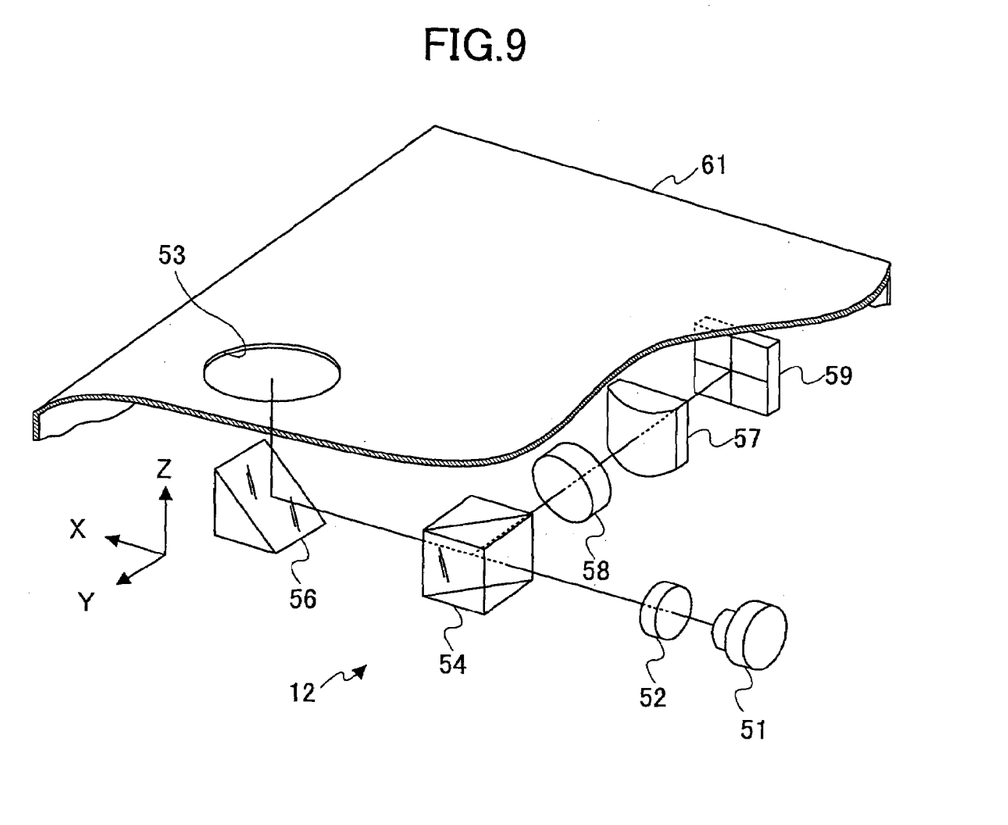
FIG. 9 is a perspective view for explaining a structure of a light output system.

FIG. 9 is a perspective view for explaining a structure of the light output system 63. As shown in FIG. 9, the light output system 63 includes a light source unit 51, a coupling lens 52, a beam splitter 54, a mirror 56, a detection lens 58, a cylindrical lens 57, and a light receiving unit (photodetector) 59.

The light source unit 51 includes a semiconductor laser (not shown) which emits a laser beam having a wavelength of 660 nm. The light source unit 51 is fixed on the housing 61 so that a maximum intensity output (emission) direction of the laser beam emitted from the light source unit 51 matches the +X direction along the X-axis.

The coupling lens 52 is arranged on the +X direction side with respect to the light source unit 51, and converts the laser beam into an approximately parallel light. The beam splitter 54 is arranged on the +X direction side with respect to the coupling lens 52, and splits the reflected laser beam from the recording surface of the optical disk 31 in a −Y direction along the Y-axis. The mirror 56 is arranged on the +X direction side with respect to the beam splitter 54, and changes the maximum intensity output direction of the laser beam transmitted through the beam splitter 54 to the +Z direction along the Z-axis. The laser beam reflected by the mirror 56 is supplied to the converging system 62 via an opening 53 provided in the housing 61.

The detection lens 58 is arranged on the −Y direction side with respect to the beam splitter 54, and converges the reflected laser beam which is split in the −Y direction by the beam splitter 54. The cylindrical lens 57 is arranged on the −Y direction side with respect to the detection lens 58, and shapes the reflected laser beam which is converged by the detection lens 58. The light receiving unit 59 is arranged on the −Y direction side with respect to the cylindrical lens 57, and has a light receiving surface (light detecting surface) for receiving the reflected laser beam which is shaped by the cylindrical lens 57. The light receiving unit 59 is made up of a 4-part photodetector, similarly to a conventional optical disk apparatus. The 4-part photodetector has four photodetector parts (or regions) which respectively output a signal (current signal) dependent on an amount of light received. The current signals from the four photodetector parts of the 4-part photodetector forming the light receiving unit 59 are output to the reproduced signal processing circuit 37 shown in FIG. 6. In other words, inside the housing 61, an optical path is formed for directing the laser beam emitted from the light source unit 51 to the converging system 62 and for directing the reflected laser beam from the recording surface of the optical disk 31 to the light receiving unit 59.

Figure 10:
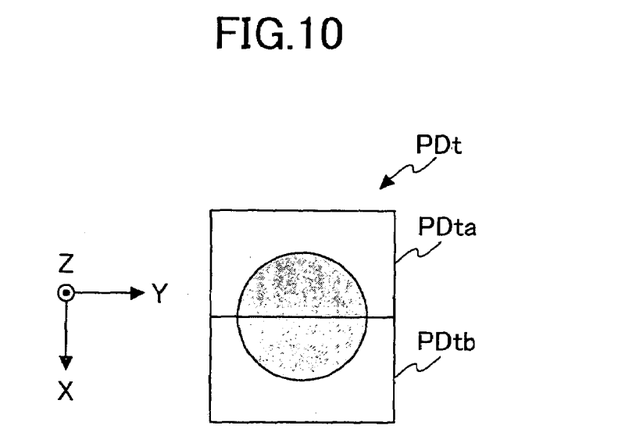
FIG. 10 is a diagram showing a tilt sensor.

FIG. 10 is a diagram showing the tilt sensor TS. A laser beam for detecting the tilt is emitted from a semiconductor laser LDt of the light source unit 51 shown in FIG. 9 and irradiated on the recording surface of the optical disk 31, and the reflected laser beam from the optical disk 31 is received by a light receiving unit PDt forming the tilt sensor TS. As shown in FIG. 10, the light receiving unit PDt is formed by a 2-part photodetector having two photodetector parts (regions) PDta and PDtb which respectively output a signal (current signal) dependent on an amount of light received. The current signals from the two photodetector parts PDta and PDtb of the 2-part photodetector forming the light receiving unit PDt are output to the reproduced signal processing circuit 37 shown in FIG. 6.

The output signal of the tilt sensor TS (output signals of the photodetector parts PDta and PDtb) is converted into a voltage signal by the I/V converter and amplifier 37$a$, and is input as the tilt correction signal to the tilt control signal generating circuit 37$h$, via the tilt sensor signal generation circuit 37$f$ and the tilt correction signal generating circuit 37$g$. The tilt control signal generating circuit 37$h$ amplifies the tilt correction signal by a predetermined gain, and outputs the tilt control signal Sout to the driver 36. The driver 36 outputs to the optical pickup unit 33 a tilt drive current dependent on the tilt control signal Sout. In other words, the tilt drive current is the current that is applied to the focusing coils 21$a$ and 21$b$.

Further, the present invention is not limited to these embodiments, but various variations and modifications may be made without departing from the scope of the present invention.

What is claimed is:

1. A lens actuator comprising:
   a lens holder to support an objective lens, said lens holder having a pair of first side surfaces in a tracking direction and a pair of second side surfaces in a tangential direction;
   wire springs, provided on the first side surfaces of the lens holder, to support the lens holder;
   a pair of fixed magnets disposed to confront the second side surfaces of the lens holder, each of the magnets having four regions which are defined by mutually perpendicular first and second magnetic boundary lines and have approximately the same area and are magnetic, such that magnetic directions of the four regions are perpendicular to a plane including a focusing direction and the tracking direction but are in opposite directions between two mutually adjacent regions, said first magnetic boundary line extending in the focusing direction, said second magnetic boundary line extending in the tracking direction;
   a pair of yokes having a predetermined thickness and having the corresponding magnets fixed thereon;
   first coils disposed between each second surface of the lens holder and each magnet and arranged on both sides of the first magnetic boundary line along the second magnetic boundary line of each magnet, said first coils being arranged symmetrically with respect to an optical axis of the objective lens; and
   second coils disposed between each second surface of the lens holder and each magnet and arranged on both sides of the second magnetic boundary line along the first magnetic boundary line of each magnet, said second coils being arranged symmetrically with respect to the optical axis of the objective lens,
   a first pair of diagonally arranged first coils generating thrusts in the same direction and a second pair of diagonally arranged first coils generating thrusts in mutually opposite directions, in response to power supplied independently thereto.

2. The lens actuator as claimed in claim 1, wherein the first pair of first coils form focusing coils to generate thrusts in the focusing direction, the second pair of first coils form radial tilt coils to generate thrusts in the focusing direction, and the second coils form tracking coils to generate thrusts in the tracking direction.

3. The lens actuator as claimed in claim 2, wherein:
   of three kinds of coils made up of the focusing coils, the radial tilt coils and the tracking coils, at least two kinds have identical specifications.

4. The lens actuator as claimed in claim 1, wherein:
   the first and second coils are approximately accommodated within a projection area of the magnets in the tangential direction.

5. An optical pickup unit comprising:
   a light source to generate a light beam;
   an objective lens to converge the light beam from the light source on a recording medium;
   a lens actuator to move the objective lens, said lens actuator comprising:
      a lens holder to support the objective lens, said lens holder having a pair of first side surfaces in a tracking direction and a pair of second side surfaces in a tangential direction;
      wire springs, provided on the first side surfaces of the lens holder, to support the lens holder;
      a pair of fixed magnets disposed to confront the second side surfaces of the lens holder, each of the magnets having four regions which are defined by mutually perpendicular first and second magnetic boundary lines and have approximately the same area and are magnetic, such that magnetic directions of the four regions are perpendicular to a plane including a focusing direction and the tracking direction but are in opposite directions between two mutually adjacent regions, said first magnetic boundary line extending in the focusing direction, said second magnetic boundary line extending in the tracking direction;

a pair of yokes having a predetermined thickness and having the corresponding magnets fixed thereon;

first coils disposed between each second surface of the lens holder and each magnet and arranged on both sides of the first magnetic boundary line along the second magnetic boundary line of each magnet, said first coils being arranged symmetrically with respect to an optical axis of the objective lens; and second coils disposed between each second surface of the lens holder and each magnet and arranged on both sides of the second magnetic boundary line along the first magnetic boundary line of each magnet, said second coils being arranged symmetrically with respect to the optical axis of the objective lens; and a power supply section to supply power to the first and second coils so that the first coils generate thrusts in the focusing direction and the second coils generate thrusts in the tracking direction, said power supply section independently supplying the power a first pair of diagonally arranged first coils and a second pair of diagonally arranged first coils, so that the first pair of first coils generate thrusts in the same direction and the second pair of first coils generate thrusts in mutually opposite directions.

6. An optical disk apparatus to record and/or reproduce information to and/or from an optical disk by a light beam, comprising:

a light source to generate the light beam;

an objective lens to converge the light beam from the light source on the optical disk;

a lens actuator to move the objective lens, said lens actuator comprising:

a lens holder to support the objective lens, said lens holder having a pair of first side surfaces in a tracking direction and a pair of second side surfaces in a tangential direction;

wire springs, provided on the first side surfaces of the lens holder, to support the lens holder;

a pair of fixed magnets disposed to confront the second side surfaces of the lens holder, each of the magnets having four regions which are defined by mutually perpendicular first and second magnetic boundary lines and have approximately the same area and are magnetic, such that magnetic directions of the four regions are perpendicular to a plane including a focusing direction and the tracking direction but are in opposite directions between two mutually adjacent regions, said first magnetic boundary line extending in the focusing direction, said second magnetic boundary line extending in the tracking direction;

a pair of yokes having a predetermined thickness and having the corresponding magnets fixed thereon;

first coils disposed between each second surface of the lens holder and each magnet and arranged on both sides of the first magnetic boundary line along the second magnetic boundary line of each magnet, said first coils being arranged symmetrically with respect to an optical axis of the objective lens; and second coils disposed between each second surface of the lens holder and each magnet and arranged on both sides of the second magnetic boundary line along the first magnetic boundary line of each magnet, said second coils being arranged symmetrically with respect to the optical axis of the objective lens; and a power supply section to supply power to the first and second coils so that the first coils generate thrusts in the focusing direction and the second coils generate thrusts in the tracking direction, said power supply section independently supplying the power a first pair of diagonally arranged first coils and a second pair of diagonally arranged first coils, so that the first pair of first coils generate thrusts in the same direction and the second pair of first coils generate thrusts in mutually opposite directions.

7. A lens actuator comprising:

a lens holder to support an objective lens, said lens holder having a pair of first side surfaces in a tracking direction and a pair of second side surfaces in a tangential direction;

a fixed magnet disposed to confront the second side surface of the lens holder, said magnet comprising four regions having approximately the same area and are magnetic, such that magnetic directions of the four regions are perpendicular to a plane including a focusing direction and the tracking direction but are in opposite directions between two mutually adjacent regions;

a pair of tracking coils disposed between the second surface of the lens holder and the magnet and having centers located on an outer side of corresponding centers of the four regions of each magnet in the tracking direction, said pair of tracking coils being arranged symmetrically with respect to an optical axis of the objective lens;

a focusing coil disposed between the second surface of the lens holder and the magnet, and having a center located on an outer side of corresponding centers of the four regions of the magnet in the focusing direction; and a radial tilt coil disposed between the second surface of the lens holder and the magnet, and having a center located on an outer side of corresponding centers of the four regions of the magnet in the focusing direction.

8. The lens actuator as claimed in claim 7, wherein the tracking coils generate thrusts in the tracking direction, and the focusing coil and the radial tilt coil generate thrusts in the focusing direction, in response to power supplied thereto.

9. The lens actuator as claimed in claim 7, wherein:

of three kinds of coils made up of the tracking coils, the focusing coil and the radial tilt coil, at least two kinds have identical specifications.

10. The lens actuator as claimed in claim 7, wherein the tracking coils, the focusing coil and the radial tilt coil are approximately accommodated within a projection area of the magnet in the tangential direction.

11. An optical pickup unit comprising:

a light source to generate a light beam;

an objective lens to converge the light beam from the light source on a recording medium;

a lens actuator to move the objective lens, said lens actuator comprising:

a lens holder to support the objective lens, said lens holder having a pair of first side surfaces in a tracking direction and a pair of second side surfaces in a tangential direction;

a fixed magnet disposed to confront the second side surface of the lens holder, said magnet comprising four regions having approximately the same area and are magnetic, such that magnetic directions of the four regions are perpendicular to a plane including a focusing direction and the tracking direction but are in opposite directions between two mutually adjacent regions;

a pair of tracking coils disposed between the second surface of the lens holder and the magnet and having centers located on an outer side of corresponding centers of the four regions of each magnet in the tracking direction, said pair of tracking coils being arranged symmetrically with respect to an optical axis of the objective lens;

a focusing coil disposed between the second surface of the lens holder and the magnet, and having a center located on an outer side of corresponding centers of the four regions of the magnet in the focusing direction; and a radial tilt coil disposed between the second surface of the lens holder and the magnet, and having a center located on an outer side of corresponding centers of the four regions of the magnet in the focusing direction; and a power supply section to supply power to the tracking coils, the focusing coil and the radial tilt coil so that the tracking coils generate thrusts in the tracking direction and the focusing coil and the radial tilt coil generate thrusts in the focusing direction, said power supply section independently supplying the power to the focusing coil and the radial tilt coil.

12. An optical disk apparatus to record and/or reproduce information to and/or from an optical disk by a light beam, comprising:

a light source to generate the light beam;

an objective lens to converge the light beam from the light source on the optical disk;

a lens actuator to move the objective lens, said lens actuator comprising:

a lens holder to support the objective lens, said lens holder having a pair of first side surfaces in a tracking direction and a pair of second side surfaces in a tangential direction;

a fixed magnet disposed to confront the second side surface of the lens holder, said magnet comprising four regions having approximately the same area and are magnetic, such that magnetic directions of the four regions are perpendicular to a plane including a focusing direction and the tracking direction but are in opposite directions between two mutually adjacent regions;

a pair of tracking coils disposed between the second surface of the lens holder and the magnet and having centers located on an outer side of corresponding centers of the four regions of each magnet in the tracking direction, said pair of tracking coils being arranged symmetrically with respect to an optical axis of the objective lens;

a focusing coil disposed between the second surface of the lens holder and the magnet, and having a center located on an outer side of corresponding centers of the four regions of the magnet in the focusing direction; and a radial tilt coil disposed between the second surface of the lens holder and the magnet, and having a center located on an outer side of corresponding centers of the four regions of the magnet in the focusing direction; and a power supply section to supply power to the tracking coils, the focusing coil and the radial tilt coil so that the tracking coils generate thrusts in the tracking direction and the focusing coil and the radial tilt coil generate thrusts in the focusing direction, said power supply section independently supplying the power to the focusing coil and the radial tilt coil.

* * * * *